(12) United States Patent
Higashi et al.

(10) Patent No.: US 8,879,128 B2
(45) Date of Patent: Nov. 4, 2014

(54) IMAGE READING APPARATUS, METHOD FOR READING IMAGE, AND STORAGE MEDIUM THAT DETECTS A FLOATING DISTANCE

(75) Inventors: Toshikazu Higashi, Toyokawa (JP); Masahiro Nonoyama, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1868 days.

(21) Appl. No.: 11/746,915

(22) Filed: May 10, 2007

(65) Prior Publication Data

US 2008/0037077 A1 Feb. 14, 2008

(30) Foreign Application Priority Data

Aug. 11, 2006 (JP) .................................. 2006-220116

(51) Int. Cl.
| | |
|---|---|
| H04N 1/54 | (2006.01) |
| H04N 1/56 | (2006.01) |
| H04N 1/60 | (2006.01) |
| H04N 1/00 | (2006.01) |
| H04N 1/04 | (2006.01) |
| H04N 1/047 | (2006.01) |
| G03F 3/00 | (2006.01) |
| H04N 1/12 | (2006.01) |
| H04N 1/10 | (2006.01) |

(52) U.S. Cl.
CPC ........... *H04N 1/121* (2013.01); *H04N 1/00005* (2013.01); *H04N 1/00018* (2013.01); *H04N 1/1017* (2013.01); *H04N 1/00909* (2013.01); *H04N 1/00588* (2013.01); *H04N 1/00092* (2013.01)
USPC ........... 358/474; 358/500; 358/505; 358/518; 358/519; 358/520; 358/521; 358/400; 358/443; 358/448; 358/488; 358/494; 358/496; 358/498; 399/365; 399/367; 271/3.01; 271/3.15; 271/3.17; 271/8.1

(58) Field of Classification Search
CPC . H04N 1/04; H04N 1/00092; H04N 1/00018; H04N 1/1235
USPC ......... 358/500, 505, 518–521, 400, 443, 448, 358/474, 488, 494, 496, 498; 399/365, 367; 271/3.01, 3.15, 3.17, 8.1
See application file for complete search history.

(56) References Cited

U.S. PATENT DOCUMENTS

| | | | | |
|---|---|---|---|---|
| 5,241,346 | A | * | 8/1993 | Ide et al. ........................ 399/209 |
| 5,276,530 | A | * | 1/1994 | Siegel ............................ 358/406 |

(Continued)

FOREIGN PATENT DOCUMENTS

| | | |
|---|---|---|
| JP | 05-161002 | 6/1993 |
| JP | 8-123157 A | 5/1996 |

(Continued)

OTHER PUBLICATIONS

Notification of Reason(s) for Refusal in JP 2006-220116 dated Jul. 25, 2008, and English Translation thereof.

(Continued)

*Primary Examiner* — King Poon
*Assistant Examiner* — Beniyam Menberu
(74) *Attorney, Agent, or Firm* — Buchanan Ingersoll & Rooney PC

(57) ABSTRACT

An image reading apparatus is disclosed. The image reading apparatus includes an automatic document feeding unit that transports a document in a predetermined direction while the document floats above a platen glass member and a light source disposed below the platen glass member that irradiates a portion on the document at a predetermined reading location such that reflected light from the portion on the document is converted into image data and a floating distance between the document and the platen glass member is detected to set a value of an image parameter for correcting the image data for the document, based on the detected floating distance between the document and the platen glass member.

20 Claims, 11 Drawing Sheets

(56) References Cited

U.S. PATENT DOCUMENTS

| | | | |
|---|---|---|---|
| 5,541,626 A * | 7/1996 | Hiramatsu et al. | 347/8 |
| 5,585,926 A | 12/1996 | Fujii et al. | |
| 5,764,382 A * | 6/1998 | Shiraishi | 358/496 |
| 5,825,513 A * | 10/1998 | Hasegawa | 358/498 |
| 6,563,938 B1 * | 5/2003 | Harada | 382/108 |
| 6,565,080 B1 * | 5/2003 | Schaefer et al. | 271/171 |
| 6,809,796 B2 * | 10/2004 | Sugeta | 355/40 |
| 7,466,956 B2 * | 12/2008 | Shoji | 399/367 |
| 2004/0169873 A1 * | 9/2004 | Nagarajan | 358/1.9 |
| 2005/0163546 A1 * | 7/2005 | Kim | 399/367 |
| 2006/0250664 A1 * | 11/2006 | Chien | 358/474 |
| 2006/0285176 A1 * | 12/2006 | Togashi | 358/474 |
| 2007/0069445 A1 * | 3/2007 | Kakuta | 271/3.14 |
| 2007/0206235 A1 * | 9/2007 | Ikeno | 358/474 |
| 2007/0216969 A1 * | 9/2007 | Nishina | 358/509 |

FOREIGN PATENT DOCUMENTS

| | | | | |
|---|---|---|---|---|
| JP | 11-155072 | * | 6/1999 | H04N 1/407 |
| JP | 2000-201260 A | | 7/2000 | |
| JP | 2002-271620 A | | 9/2002 | |
| JP | 2003-069823 | | 3/2003 | |
| JP | 2003069823 A | * | 3/2003 | H04N 1/407 |
| JP | 2004-320538 | | 11/2004 | |

OTHER PUBLICATIONS

Notification of Reason(s) for Refusal in JP 2006-220116 dated Oct. 28, 2008, and a English Translation thereof.

* cited by examiner

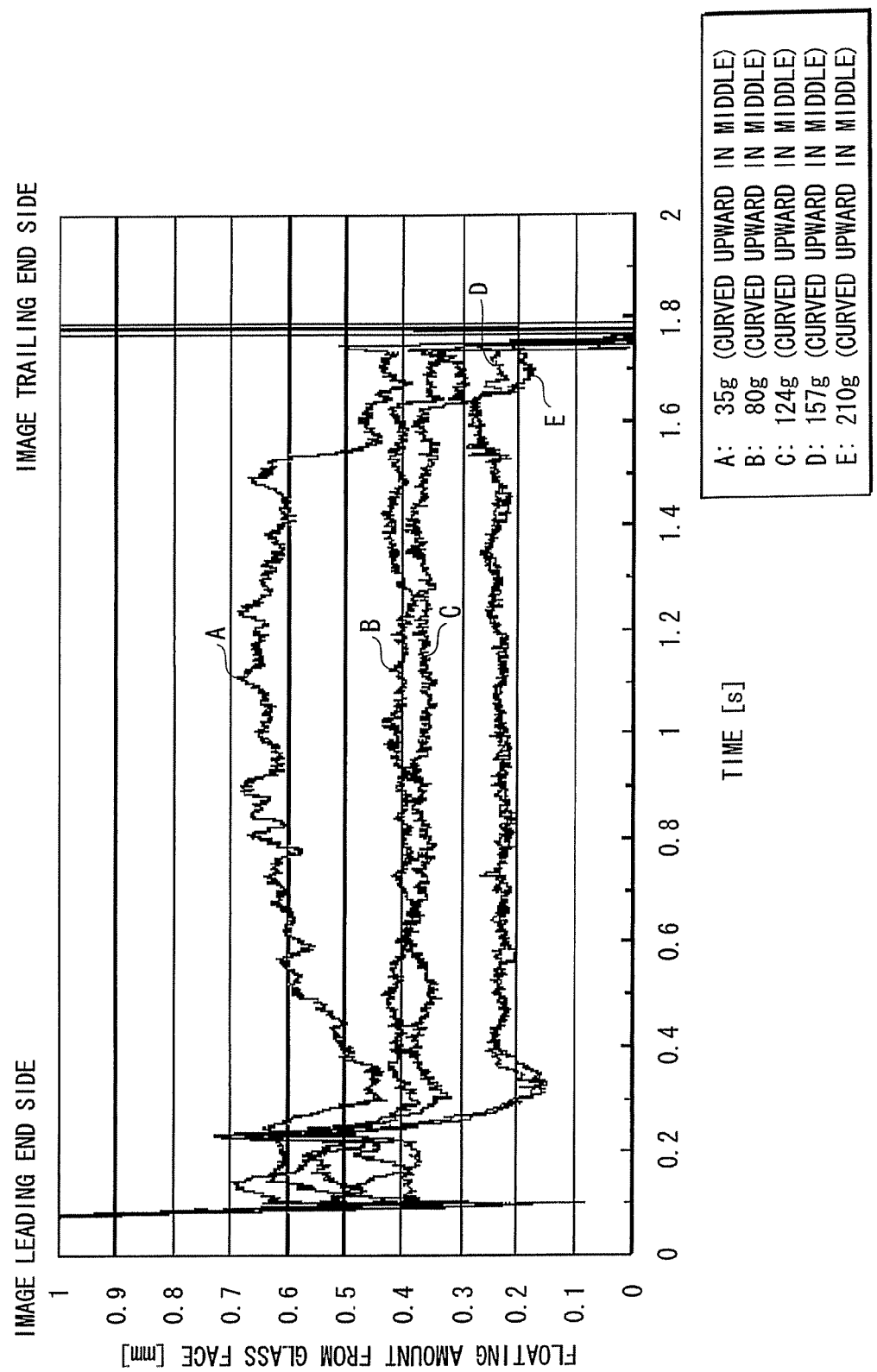

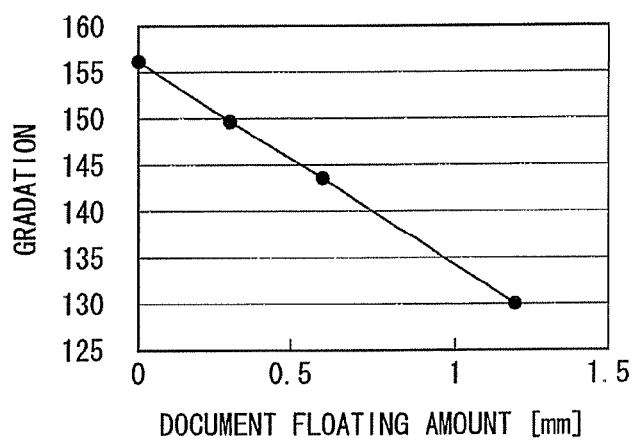
FIG. 5A DOCUMENT GRADATION REPRODUCTION
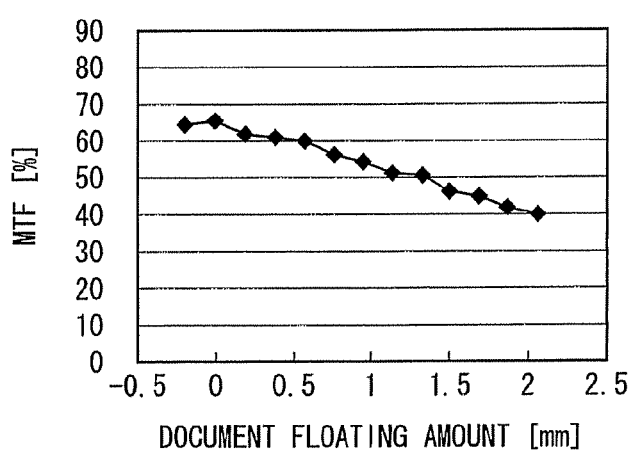
FIG. 5B MTF
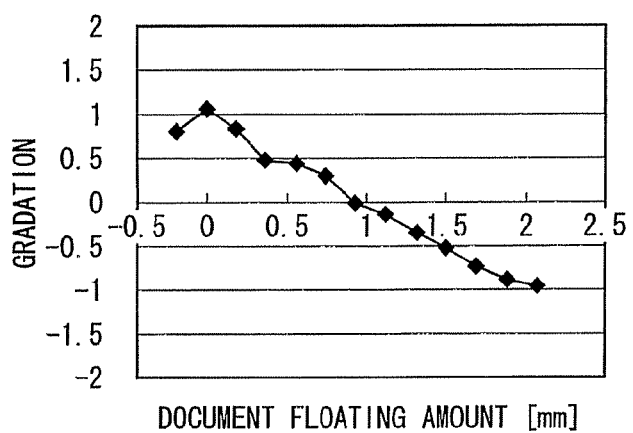
FIG. 5C COLOR DIFFERENCE WITHIN PAGE, L DATA OD=0.3

| FLOATING AMOUNT RANGE | IMAGE PARAMETER CORRECTION | |
|---|---|---|
| | DENSITY CORRECTION | SHARPNESS CORRECTION |
| H0 − d3 | A + α3 | B + β3 |
| H0 − d2 | A + α2 | B + β2 |
| H0 − d1 | A + α1 | B + β1 |
| H0 | A | B |
| H0 + d1 | A − α1 | B − β1 |
| H0 + d2 | A − α2 | B − β2 |
| H0 + d3 | A − α3 | B − β3 |
| . | . | . |
| . | . | . |
| . | . | . |
| . | . | . |

IMAGE READING APPARATUS, METHOD FOR READING IMAGE, AND STORAGE MEDIUM THAT DETECTS A FLOATING DISTANCE

This application is based on applications No. 2006-220116 filed in Japan, the contents of which are hereby incorporated by reference.

BACKGROUND OF THE INVENTION (1) Field of the Invention

The present invention relates to an image reading apparatus for reading an image on a document using a so-called sheet-through type reading, a method for reading an image, and a storage medium.

(2) Description of the Related Art

In view of convenience for users, in recent years, for image reading apparatuses provided in image forming apparatuses such as copiers, the movable optical system has been adopted, in which an image on a document is read while an optical system is moving below the document placed on a platen glass, and in addition to the movable optical system, the sheet-through type has been increasingly available in the market. In the sheet-through type, an optical system stays below a platen glass, and an image on a document is read while being led by an automatic document feeder (ADF) through a reading location on the upper face of the platen glass.

For example, Japanese Patent Application Publication No. H08-123157 has disclosed a sheet-through type image reading apparatuses, in which a document is transported while floating above the platen glass in order to prevent image streaks caused by foreign substances, such as paper particles from the document, remaining on the platen glass.

However, when a document floats above the platen glass, the floating amount from the platen glass varies depending on the paper type such as thin paper having a high permeability and firm thick paper. Thus, when the floating amount varies, density unevenness and the like slightly occur. Accordingly, it is difficult to uniformly read documents.

SUMMARY OF THE INVENTION

It is an object of the present invention to provide an image reading apparatus having less density unevenness and the like in a read image, a method for reading an image, and a storage medium.

The above-described object is realized by an image reading apparatus, comprising: an automatic document feeding unit operable to transport a document in a predetermined direction while the document floats above a platen glass member; a reading unit operable to read an image on the document being transported, at a predetermined reading location, by irradiating a portion on the document at the reading location using a light source disposed below the platen glass member, and by receiving reflected light from the portion on the document; a converting unit operable to convert the reflected light into image data; a detecting unit operable to detect a floating amount of the document from the platen glass member; and a setting unit operable to set a value of an image parameter for correcting the image data for the document, based on the detected floating amount.

With this image reading apparatus, image parameters such as density and MTF are adjusted as appropriate based on the floating amount detected at that time, even if there is a difference in the floating amount between documents due to the document type, the thickness, or the like. Thus, a high image quality can be kept while securing an advantage of a sheet-through type reading, such as suppressing stain on the platen glass.

Furthermore, it is also possible that the setting unit comprises a table in which floating amounts from the platen glass member are associated with values of the image parameter, and obtains and sets the value of the image parameter referring to the table, based on the detected floating amount.

By obtaining an image parameter referring to a table in this manner, it is not necessary to perform computing. Thus, this image reading apparatus is suitable for a high-speed process.

Furthermore, it is also possible that the image reading apparatus further comprises an input unit used by an operator to adjust the value of the image parameter; and a correcting unit operable to correct the set value of the image parameter using an adjustment value that has been input from the input unit.

With this image reading apparatus, a user can customize image correction on each apparatus. Thus, each user can enjoy expressing subtle nuances in an image.

Furthermore, it is also possible that the image parameter is one of a sharpness correction parameter and a density correction parameter.

Furthermore, it is also possible that the detecting unit detects the floating amount, once, in a state where the document is held at its leading end by rollers in a downstream of the reading location in a document transport direction, and its trailing end by rollers in an upstream of the reading location in the document transport direction, and the setting unit sets the value of the image parameter for the document, once, based on the detected floating amount.

The floating amount at an approximately central portion of one document is maintained for the longest time during a period in which the document passes the reading location. Thus, with this image reading apparatus, it is possible to adjust an image parameter as appropriate by adjusting the image parameter only once for one document.

Furthermore, it is also possible that the detecting unit detects a floating amount, at each of a plurality of positions from the leading end to the trailing end of the document, and the setting unit sets values of the image parameter for the document, based on the respective floating amounts detected at the plurality of positions.

With this image reading apparatus, even if the floating amount changes during a period in which the entire document from the leading end to the trailing end passes the reading location, the image parameter can be corrected in accordance with this change. Thus, it is possible to read image data at a higher quality and precision.

Also, the above-described object is realized by a method for reading an image in an image reading apparatus, comprising: a document transporting step of transporting a document with an automatic document feeding unit in a predetermined direction while the document floats above a platen glass member, a reading step of reading an image on the document being transported, at a predetermined reading location, by irradiating a portion on the document at the reading location using a light source disposed below the platen glass member, and by receiving reflected light from the portion on the document; a converting step of converting the reflected light into image data; a detecting step of detecting a floating amount of the document from the platen glass member; and a setting step of setting a value of an image parameter for correcting the image data for the document, based on the detected floating amount.

Also, the above-described object is realized by a computer-readable storage medium storing a program for executing an image reading process in an image reading apparatus, wherein the program lets a computer execute: a document transporting process of transporting a document with an automatic document feeding unit in a predetermined direction while the document floats above a platen glass member, a reading process of reading an image on the document being transported, at a predetermined reading location, by irradiating a portion on the document at the reading location using a light source disposed below the platen glass member, and by receiving reflected light from the portion on the document; a converting process of converting the reflected light into image data; a detecting process of detecting a floating amount of the document from the platen glass member; and a setting process of setting a value of an image parameter for correcting the image data for the document, based on the detected floating amount.

BRIEF DESCRIPTION OF THE DRAWINGS

These and other objects, advantages and features of the invention will become apparent from the following description thereof taken inconjunction with the accompanying drawings which illustrate a specific embodiment of the invention.

In the drawings:

FIG. 4 is experimental data showing differences in the floating amount, caused by the weight of documents;

FIG. 5A is a diagram showing a change in the document gradation reproduction, caused by the floating amount;

FIG. 5B is a diagram showing a change in an MTF value, caused by the floating amount;

FIG. 5C is a diagram showing a change in the color difference within a page, caused by the floating amount;

DESCRIPTION OF PREFERRED EMBODIMENTS

First Embodiment

Figure 1:
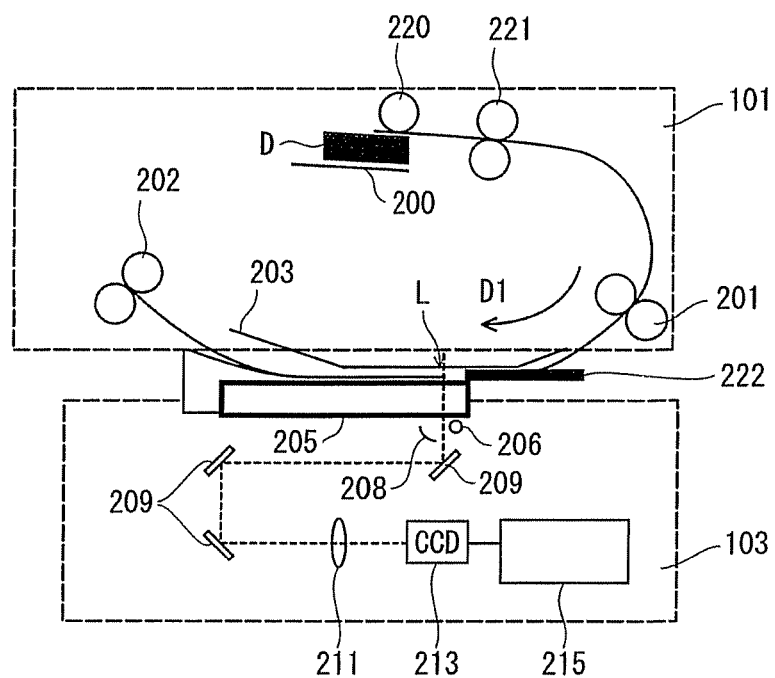
FIG. 1 is a view showing an image reading apparatus as a first embodiment according to the present invention.

FIG. 1 is a view showing the configuration of a sheet-through type image reading apparatus 100 having an automatic document feeder (ADF) as an embodiment of the present invention. In FIG. 1, a block 101 indicated by a broken line corresponds to an automatic document feeding unit, and a block 103 corresponds to an image reading unit.

<Automatic Document Feeding Unit>

The automatic document feeding unit 101 includes a paper feed tray 200, a paper feed roller 220, separation rollers 221, pre-reading rollers 201, and post-reading rollers 202. These rollers are arranged on a document transport path. The paper feed tray 200 has a guide member for preventing paper from inclining while the paper is fed. The size of a document on the paper feed tray 200 can be judged, using a combination of a position detection sensor connected to the guide member and a plurality of document detecting members provided in the transport direction on the paper feed tray 200.

The size of documents D that are stacked on the paper feed tray 200 is judged by the above-described configuration. The documents D are fed by the paper feed roller 220 and transported to the downstream with multi-feeding being prevented by the separation rollers 221, via the pre-reading rollers 201 up to a reading location L. At the reading location L, a platen glass 205 and a back face plate 203 are opposed and vertically spaced apart from each other.

A transport guide member 222 is provided in the upstream of the platen glass 205 in the document transport direction (D1), at a position slightly higher than the upper face of the platen glass 205. The transport guide member 222 regulates the transport direction and the posture of the document D that is being transported. Accordingly, the document D passes the reading location L while floating above the platen glass 205. The post-reading rollers 202 rotate at a speed slightly higher than that of the pre-reading rollers 201. Thus, after the leading end of the document D has been held by the post-reading rollers 202, the floating of the document D from the platen glass 205 is kept by this difference in the speed between the pre-reading rollers 201 and the post-reading rollers 202.

Although not shown in FIG. 1, a floating amount detector is provided in the vicinity of the reading location L. The floating amount detector detects the floating amount of the document D that passes the reading location L, and then sends the detection results to the image reading unit 103. The floating amount detector will be described later in detail.

After the document D has passed the reading location L, the document D is transported via the post-reading rollers 202 and then discharged to a discharge stack tray (not shown), or is transported to a reverse path (not shown) for reading the rear face of the document D.

<Image Reading Unit>

The image reading unit 103 includes, below the platen glass 205, a light source 206, a reflection mirror 208, optical systems 209 and 211 such as reflection mirrors, a CCD 213, and an image processing unit 215. The light source 206 irradiates the document D that is passing the reading location L. The optical systems 209 and 211 guide, to the CCD 213, light that has been reflected from the document D at the reading location L. The image processing unit 215 performs various corrections on image data that has been read with the CCD 213.

The image reading apparatus 100 in this embodiment is configured such that it can read an image on a document selectively using one of a sheet-through type reading and a mirror-moving type reading. The sheet-through type is a fixed optical system, and the mirror-moving type is a movable optical system. More specifically, a slider unit including the light source 206, the reflection mirror 208, and the optical systems 209 and 211 such as reflection mirrors is configured so as to be movable in the document transport direction and the opposite direction.

<Control Unit>

Figure 2:
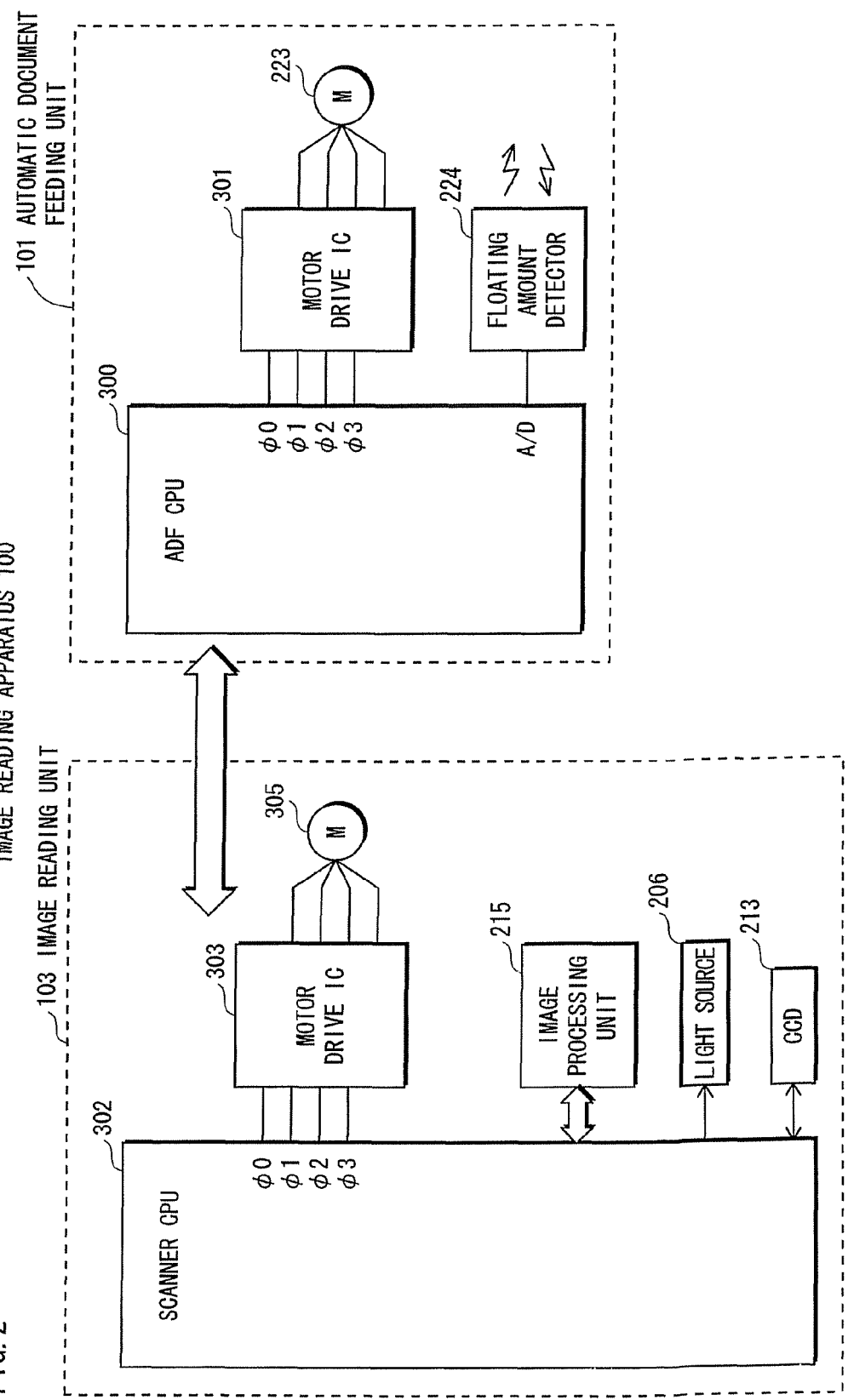
FIG. 2 is a control block diagram of an image reading unit and an automatic document feeding unit.

FIG. 2 is a block diagram of a control unit operable to control the automatic document feeding unit 101 and the image reading unit 103.

A CPU 300 for controlling the automatic document feeding unit 101 is communicably connected to a CPU 302 for controlling the image reading unit 103. The CPU 300 and the CPU 302 send and receive various types of control information such as document size information, an operation mode, and timing information for reading an image on a document, by communication with each other.

A driving pulse motor 223, a motor drive IC 301, and a floating amount detector 224 are connected to the CPU 300 of the automatic document feeding unit 101. The driving pulse motor 223 drives rollers such as the paper feed roller 220 and the separation rollers 221 that are provided on the transport path. The motor drive IC 301 drives the driving pulse motor 223. The floating amount detector 224 is provided in the vicinity of the reading location L. The driving pulse motor 223 is driven in response to excitation signals $\phi0$ to $\phi3$ that are input from the CPU 300 of the automatic document feeding unit 101 to the motor drive IC 301. Document transportation is controlled by changing factors such as the document transport speed in accordance with the magnification or the mode.

The CPU 302 controls the image reading unit 103. The CPU 302 controls the light source 206, the CCD 213, and the image processing unit 215. Furthermore, using a motor drive IC 303, the CPU 302 controls a drive motor 305 that moves the slider unit. The drive motor 305 is driven in response to excitation signals $\phi0$ to $\phi3$ that are input from the CPU 302 to the motor drive IC 303.

Figure 3:
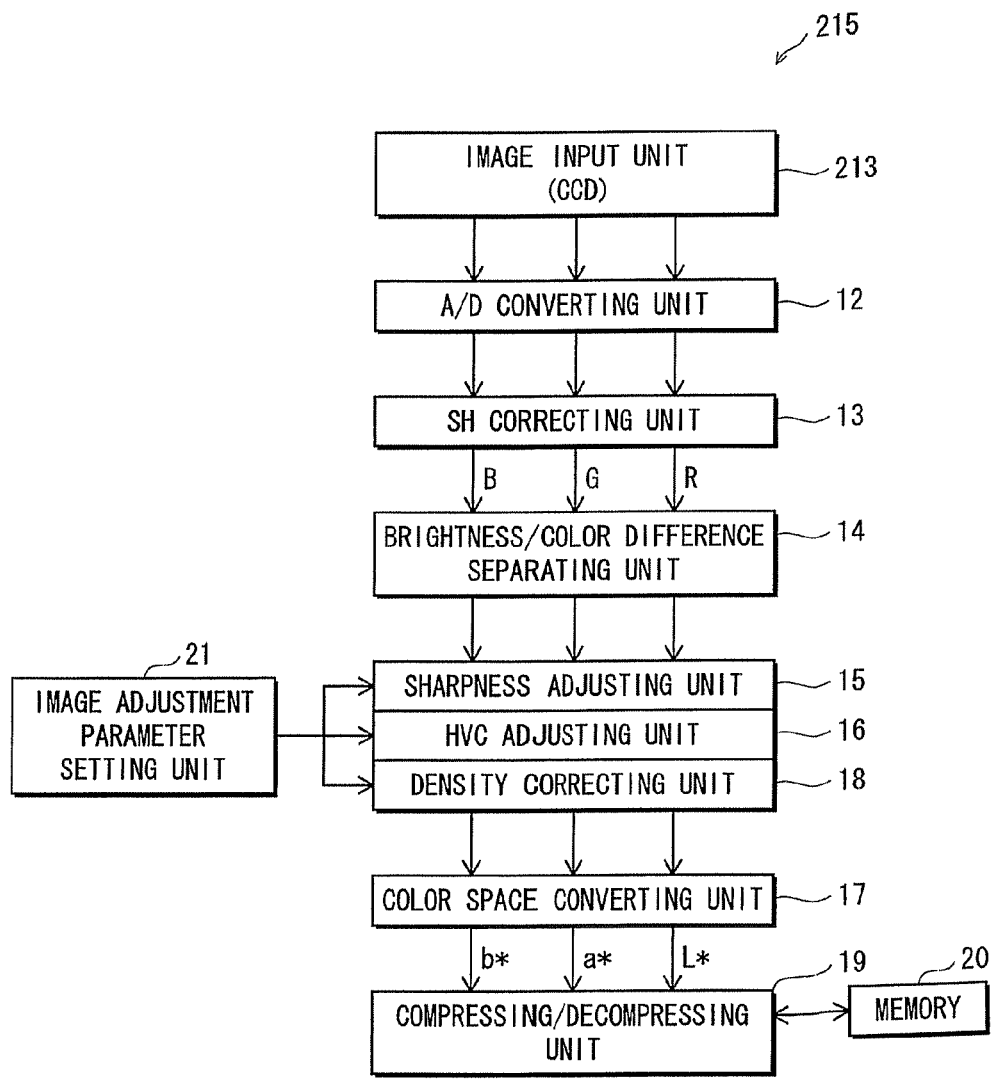
FIG. 3 is a block diagram showing a configuration example of an image processing unit.

FIG. 3 is a block diagram showing a configuration example of the image processing unit 215.

As shown in FIG. 3, the image processing unit 215 is provided with an A/D converting unit 12, a shading (SH) correcting unit 13, a brightness/color difference separating unit 14, a sharpness adjusting unit 15, an HVC adjusting unit 16, a color space converting unit 17, a density correcting unit 18, a compressing/decompressing unit 19, a memory 20, and an image adjustment parameter setting unit 21.

The image signals read by the CCD 213 are converted by the A/D converting unit 12 into digital signals (image data). Then, the SH correcting unit 13 performs shading correction on the image data. The brightness/color difference separating unit 14 separates RGB signals of the image data into brightness and color difference signals. The separated signals are adjusted and corrected respectively by the sharpness adjusting unit 15 and the HVC adjusting unit 16, and the density correcting unit 18. Then, the color space converting unit 17 converts the color space of the image into an L*a*b* color space. Then, the compressing/decompressing unit 19 compresses the data, which is stored in the memory 20.

The image adjustment parameter setting unit 21 sets image parameters for adjusting, for example, image density, for the sharpness adjusting unit 15, the HVC adjusting unit 16, and the density correcting unit 18, so as to optimize read images.

<Relationship Between Floating Amount Change and Correction Parameters>

FIG. 4 is data showing a change in the floating amount of documents with respect to the platen glass 205 in the automatic document transport mechanism of a sheet-through type. Five different types of documents, that is, documents with a weight of 35 g/m$^2$ (curved line A), 80 g/m$^2$ (curved line B), 124 g/m$^2$ (curved line C), 157 g/m$^2$ (curved line D), and 210 g/m$^2$ (curved line E) are used in the test. The horizontal line in FIG. 4 indicates the time at which a document passes the reading location L. The leading end of a document firstly passes the reading location L, and the trailing end lastly passes. Thus, in FIG. 4, the left end corresponds to the time at which the leading end of a document passes, and the right end corresponds to the time at which the trailing end of a document passes. The vertical line indicates the floating amount from the glass face, that is, the floating amount (unit: mm).

FIG. 4 results in the following findings. When the leading end of a document is in the vicinity of the reading location L, the document is cantilevered (held only by the pre-reading rollers 201). Thus, the document is close to the platen glass 205. When the middle portion of the document is at the reading location L, the leading end of the document is held by the post-reading rollers 202. In this state, a pulling tension that is generated by a difference in the speed between the pre-reading rollers 201 and the post-reading rollers 202 is applied to the document. Thus, the document is away from the platen glass 205, and thus is closer to the white back face plate 203, which is an original target position. When the trailing end of the document is at the reading location L, the document is cantilevered again. Thus, the document is closer to the platen glass 205.

Furthermore, as the weight of a document increases, the floating amount of the document in the vicinity of the middle portion becomes lower. The reason for this is that since the document becomes firmer, the document is not easily pulled up even when a pulling tension generated between the pre-reading rollers 201 and the post-reading rollers 202 is applied thereto. As shown in FIG. 4, a difference in the floating amount between documents having different weights is larger than a change in the floating amount caused by the position, between the leading end, the middle portion (approximately central portion), and the trailing end of one document.

As described later, there is a constant relationship of the floating amount with respect to, for example, the density and MTF of a read image. Thus, firstly, the density unevenness and the like caused by a difference in the floating amount between documents having different weights are eliminated, by detecting the floating amount only once for each document, and setting image parameters for the document. There is a difference in the floating amount depending on the measurement positions in the document transport direction. Thus, the floating amount is detected that can be kept for the longest time while the document is read. For example, the floating amount at the middle portion of the document corresponds to this floating amount. Accordingly, it is expected that the density unevenness is significantly eliminated. However, as shown in FIG. 4, the floating amount fluctuates at the leading end and the trailing end of the document. Thus, it is considered that the density at the leading end and the trailing end tends to be slightly lower than that at the middle portion even in one document.

Thus, secondly, the density unevenness and the like are minutely eliminated, by detecting the floating amount at a plurality of positions in the document transport direction on one document, obtaining image parameters corresponding to the floating amount detected at each position, and setting the parameters each time in the image processing unit 215. Accordingly, the density unevenness and the like caused by a change in the floating amount are almost completely eliminated.

FIGS. 5A, 5B, 5C are diagrams showing as an example the relationship between the floating amount and the influence on an image. As the influence, FIG. 5A shows the gradation level of an image obtained by reading a document having a constant density while changing the floating amount. As the floating amount is lower, the gradation level is increased. As the floating amount is higher, the gradation level is reduced.

Accordingly, when reading an image having the same density on a document, the following process is effective in order to obtain a constant gradation level regardless of the floating amount. If the document is at a height close to the platen glass 205 (floating amount is small), then it is effective to reduce the gradation level (that is, to reduce the density) to some extent. If the document is at a height apart from the platen glass 205 (floating amount is large), then it is effective to increase the gradation level (that is, to increase the density) to some extent.

FIG. 5B shows the relationship between the floating amount (corresponding to the height) and the MTF. FIG. 5B shows that also in this case, an MTF value varies depending on the floating amount. Thus, in order to obtain a constant image, it is effective to perform correction less on the sharpness as the floating amount is smaller, and to perform correction more on the sharpness as the floating amount is larger.

FIG. 5C shows the relationship between the floating amount and the color difference within a page. FIG. 5C shows, with help of differences in the gradation level, that the color difference in a read image varies depending on the floating amount. Also in this case, an image having constant image quality such as hue can be obtained by correcting color conversion parameters in accordance with the floating amount.

<Configuration of Floating Amount Detector>

Figures 6, 7:
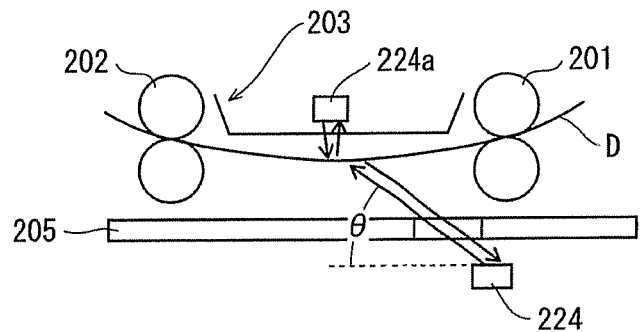
FIG. 6 is a view showing an installation example of a floating amount detector.
FIG. 7 is a table showing an association between floating amounts and image parameter values.

FIG. 6 is a view showing the configuration of the floating amount detector 224.

As shown in FIG. 6, the floating amount detector 224 includes a distance detecting unit using a PSD element. Since a PSD element is known, a detailed description thereof has been omitted. In principle, the floating amount detector 224 uses the phenomenon that when a moving target object is irradiated with a light beam obliquely with respect to the movement direction and the reflected light is received, the light receiving position varies depending on the distance from the target object. The floating amount detector 224 is disposed below the platen glass 205. When the floating amount detector 224 is disposed in this manner, the distance from the floating amount detector 224 to a document D is detected. Herein, it is required to obtain the floating amount from the platen glass 205 to the document face. Thus, it is necessary to convert the obtained distance into the floating amount. The distance can be converted using Equation (1) below.

$$H = P \sin \theta - H0 \quad (1)$$

In Equation (1), P denotes the distance from the floating amount detector 224 to the document D that is obtained using the floating amount detector 224. θ denotes the elevation angle of the light beam, at which the reflected light from the document D is incident on the floating amount detector 224. H0 denotes the vertical distance from the floating amount detector 224 to the upper face of the platen glass 205.

It should be noted that Equation (1) is a conversion equation in a case where the floating amount detector 224 detects an obliquely upper area with the elevation angle θ. If the floating amount detector 224 can be disposed so as to face upward in a substantially vertical direction, then Equation (1) can be calculated taking sin θ as 1.

Next, in FIG. 6, the symbol 224a indicates an embodiment according to another detecting method. In this example, a floating amount detector 224a is provided on the side of the back face plate 203, and detects the distance from the floating amount detector 224a to a document D. The floating amount detector 224a detects in advance the distance from the floating amount detector 224a to the platen glass 205 in a state where no document is present. The distance from the platen glass 205 to the document D can be obtained by subtracting a value A from a value B, the value A being obtained by detecting the distance from the detector 224a to the document D, and the value B being obtained by detecting the distance from the detector 224a to the platen glass 205.

It should be noted that the distance from the floating amount detector 224a to the platen glass 205 may be stored in advance as a fixed value. In this case, it is not necessary to further detect the distance from the floating amount detector 224a to the platen glass 205.

<Image Parameters>

FIG. 7 shows a table for correcting image parameters in accordance with the floating amount. In the table, a reference floating amount is taken as H0. Values that are to be set as a density correction parameter A+αn and a sharpness correction parameter B+βn are determined based on a difference between a detected floating amount and the reference floating amount H0. This table is calculated in advance based on experimental data, and is stored in the image adjustment parameter setting unit 21 in the image processing unit 215 shown in FIG. 3.

A value detected by the floating amount detector 224 (or 224a) is input to the image adjustment parameter setting unit 21. The image adjustment parameter setting unit 21 reads out, from the table, a density correction parameter and a sharpness correction parameter associated with the floating amount, and supplies the parameters to the density correcting unit 18 and the sharpness adjusting unit 15.

Using the supplied parameters, the density correcting unit 18 and the sharpness adjusting unit 15 correct values into adjusted values.

In the description above, image parameter values associated with detected floating amounts were stored in the table. However, the configuration is not limited to such a table, as long as values that are to be set as image parameters are available for the detected floating amount. For example, it is also possible to apply a configuration in which an equation for calculating image parameter values corresponding to the detected floating amount is obtained in advance based on experimental data, and parameters such as a density correction parameter are obtained using the equation and supplied to the sharpness adjusting unit 15 or the like.

<Image Correcting Process>

Figure 8:
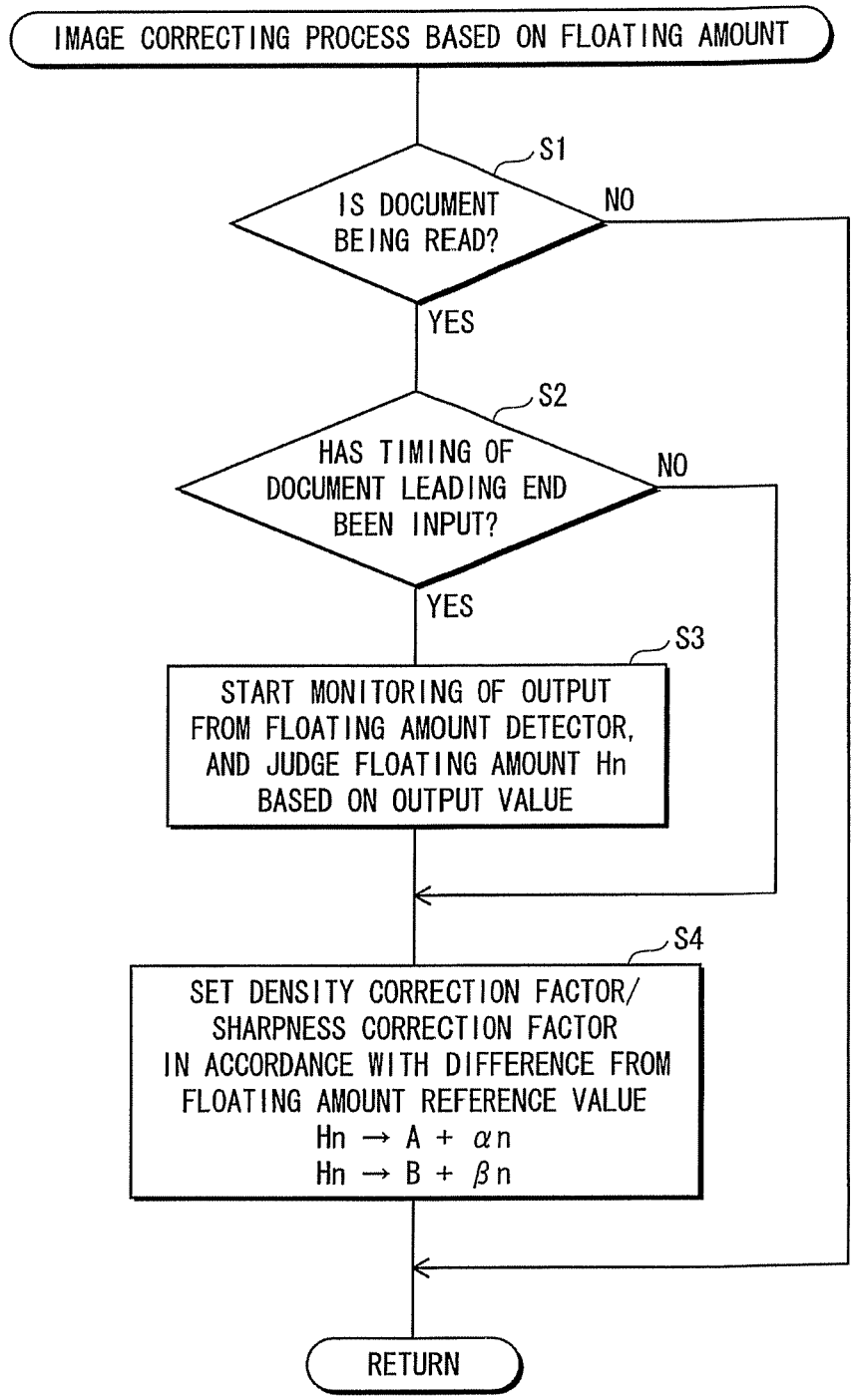
FIG. 8 is a flowchart showing a processing routine for correcting an image.

FIG. 8 is a flowchart showing an image correcting process based on the floating amount. The CPU 302 executes this process according to a control program that is stored in a storage medium such as a ROM (not shown). According to this flowchart, a process is performed in which the floating amount is detected once for one document and image parameters are set. Although not shown, there is a separate main routine. When the image correction processing subroutine based on the floating amount is called in the main routine, the flowchart in FIG. 8 is performed.

First, it is judged whether or not a document is being read (S1). A state in which a document is being read refers to a state after the document is fed from the paper feed tray 200 until the document is discharged to the discharge stack tray. If a document is being read, then it is judged whether or not the leading end of the document reaches the reading location L (S2). If the leading end reaches the reading location L, then monitoring on detected values from the floating amount detector 224 is started, and then a floating amount Hn is measured (S3).

Herein, the floating amount is detected preferably at a point of time when the middle portion of the document reaches the detection area of the floating amount detector 224, after the leading end of the document passes the reading location L. In other words, the floating amount is detected preferably in a state where the leading end portion of the document is held by the post-reading rollers 202 and the trailing end portion of the document is held by the pre-reading rollers 201. Thus, it is preferable to receive a monitoring output from the floating amount detector 224 using a timer at a predetermined time after the leading end of the document reaches the reading location L.

After the floating amount Hn is detected, image parameter correction values associated with the floating amount range including Hn (image parameter correction values corresponding to the difference between Hn and the reference floating amount H0) are obtained referring to the table in FIG. 7, and set in the image adjustment parameter setting unit 21 in FIG. 3 (S4).

Then, the procedure is returned to the main routine. Hereinafter, when the subroutine in FIG. 8 is called, the procedure proceeds to steps S1 and then S2 as long as the document is being read. However, at the second and following calls, the leading end of the document has passed the reading location L. Thus, the procedure proceeds directly to step S4, and the already obtained image parameter correction values are again set in the image adjustment parameter setting unit 21. Hereinafter, every time this subroutine is called, the same process is performed as long as the document is being read. When the reading of the document ends (S1), the procedure returns to the main routine without any processing.

In the above-described process, the floating amount is detected at the middle portion of the document. Thus, the floating amount is detected after the leading end of the document has passed the reading location L. Accordingly, real-time correction cannot be performed on the image parameters. Although not shown, image data read by the CCD 213 is temporarily stored before being input to the sharpness adjusting unit 15, and is read out when image parameter correction values are obtained In this manner, image parameter correction values are obtained and set by detecting the floating amount. Thus, it is possible to eliminate density unevenness and the like caused by a difference in the floating amount due to a difference in the paper thickness.

<Operation to Adjust Image Parameters>

Figure 9:
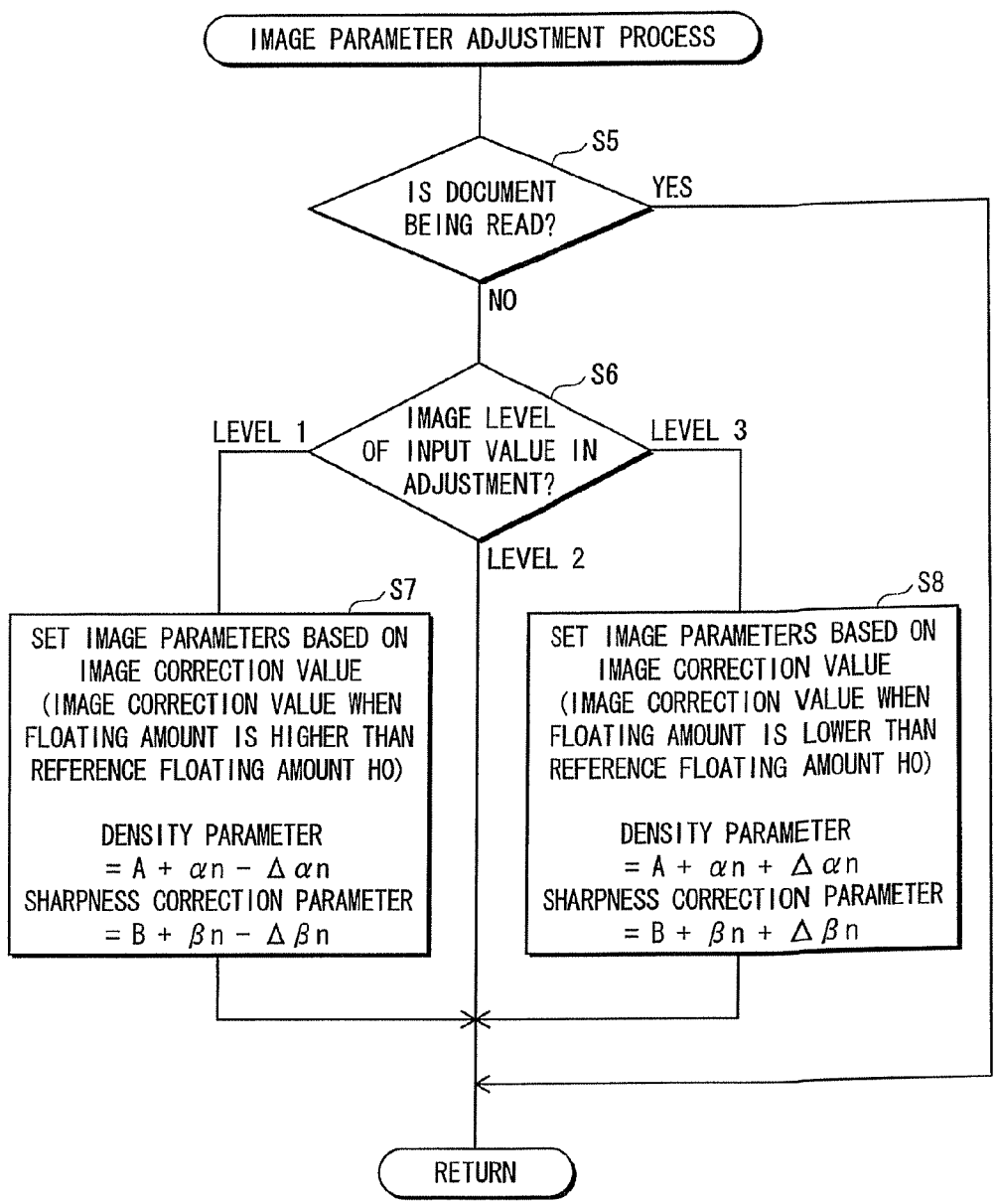
FIG. 9 is a flowchart showing a process to adjust image parameters.

FIG. 9 shows an adjustment process performed, for example, by inputting data from a control panel.

In FIG. 8, an image was corrected based on the detected floating amount. However, even when an image is corrected in this manner, it may be required to fine tune the image, for example, because the image varies depending on a difference between apparatuses. In this case, generally, image parameters are corrected by a service person or a user inputting adjustment values from a control panel. FIG. 9 shows one example of a process to change parameters in this case.

First, for example, a service person or a user presses a predetermined key on a control panel for adjusting image parameters. Then, the subroutine in FIG. 9 is called. If a document is not being read (S5), then adjustment with the image level is accepted (S6). Here, data that is input, for example, on ten keys on the control panel is accepted. For example, if the ten key "1" is pressed, then an image level 1 is selected, and correction is performed such that a density correction parameter is reduced by $\Delta\alpha n$ and a sharpness correction parameter is reduced by $\Delta\beta n$ in the image adjustment parameter setting unit 21 (S7). If the ten key "3" is pressed, then correction is performed such that a density correction parameter and a sharpness correction parameter are increased by the same amount as that in the case of the ten key 1 (S8).

In this manner, it is possible to adjust image parameters individually for each apparatus.

Second Embodiment

In the first embodiment, the floating amount was detected only once for one document, image parameters were obtained based on the detection results, and image correction was uniformly performed on read images on the document. However, in this embodiment, the floating amount is measured at a plurality of positions from the leading end to the trailing end on one document, and image parameters are corrected each time.

Figure 10:
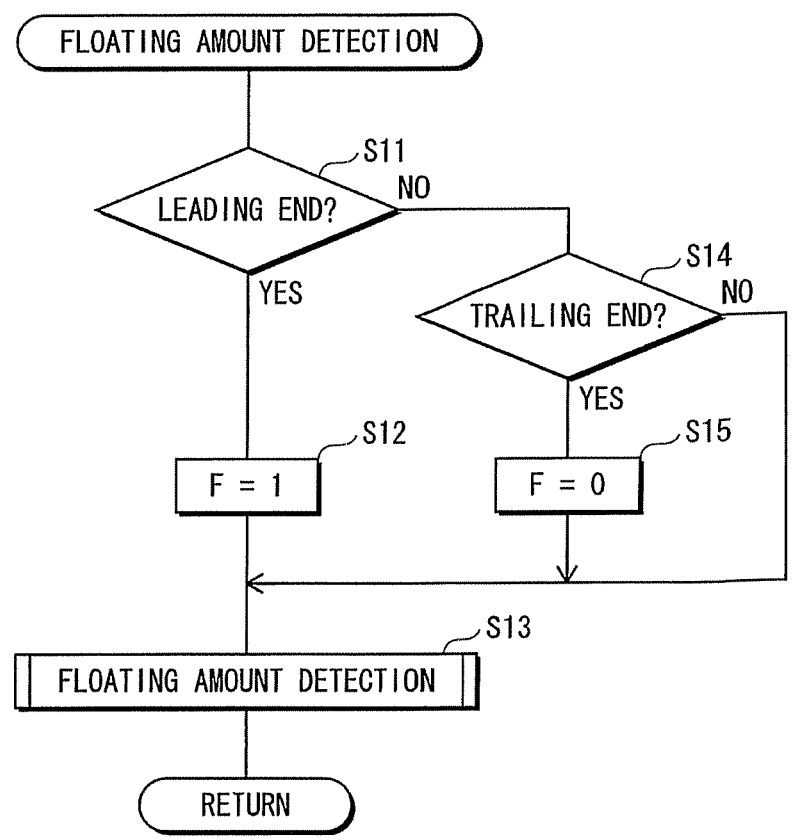
FIG. 10 is a flowchart showing a process to detect the floating amount in a second embodiment.
Figure 11:
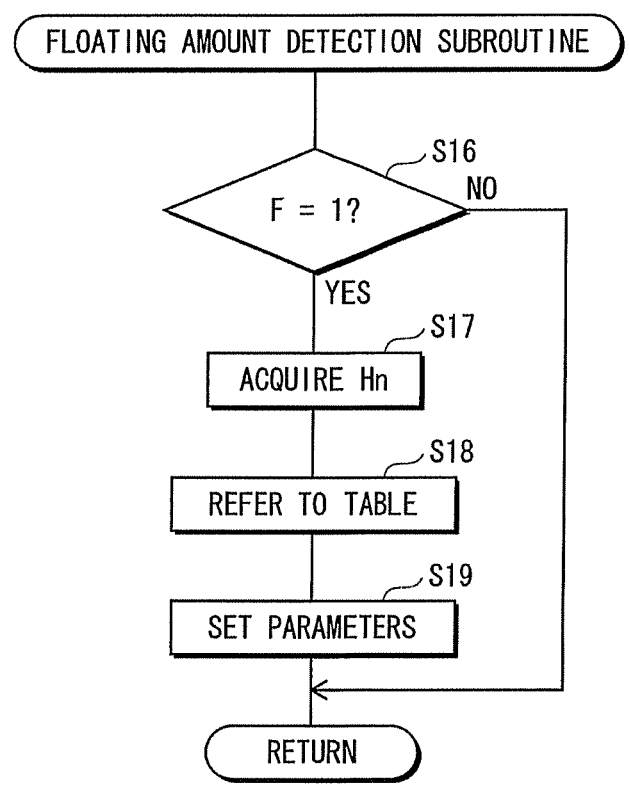
FIG. 11 is a diagram showing a subroutine of FIG. 10.

FIGS. 10 and 11 are flowcharts showing this process. The components that are not relevant to the flowcharts, such as the automatic document feeding unit 101, the floating amount detector 224, and the image processing unit 215 are the same as those in the first embodiment, and thus a description thereof has been omitted.

The flowchart shown in FIG. 10 shows a subroutine of the main routine out of the drawing. When the process ends, the procedure is returned to the main routine and another process is performed. The flowchart shown in FIG. 11 shows a subroutine of the main routine in FIG. 10. In FIGS. 10 and 11, the symbol "F" denotes a flag. When the floating amount detector 224 detects the leading end of a document, the flag is set to 1. When the floating amount detector 224 detects the trailing end of a document, the flag is set to 0. The flag value 1 indicates that a document is being read. The flag value 0 indicates that the document has been completely read.

A document is fed by the paper feed tray 200 and transported whereas the timing is adjusted by timing rollers. At a predetermined time (time necessary for the leading end of the document to reach the reading location L) after the leading end of the document has passed a timing sensor (not shown) disposed in the upstream of the reading location L in the document transport direction, it is judged that the leading end of the document has reached the reading location L (S11), and the flag F is set (F=1) (S12).

If the procedure proceeds to step S13 in a state where the flag F is set, then the subroutine in FIG. 11 is called. Accordingly, the procedure proceeds to steps S17, S18, and S19 in this order. In these steps, an value Hn detected by the floating amount detector 224 is read, a density correction value $A+\alpha n$ and a sharpness correction value $B+\beta n$ associated with this value are read out from the correction table shown in FIG. 7, and image parameters are set in the image adjustment parameter setting unit 21.

In a state where the flag F is set; every time the subroutine in FIG. 11 is called, the procedure repeatedly proceeds to steps S17, S18, and S19 in this order, where a new floating amount Hn is detected and image parameters associated therewith are set.

Then, at a predetermined time after the trailing end of the document has passed the timing sensor, it is judged that the trailing end of the document has passed the reading location L (YES in S14), then the flag is reset (F=0) (S15). In a state where the flag is reset, even if the subroutine in FIG. 11 is called, it is judged to be "NO" in step S16, and thus image parameter values are not changed.

Figure 12:
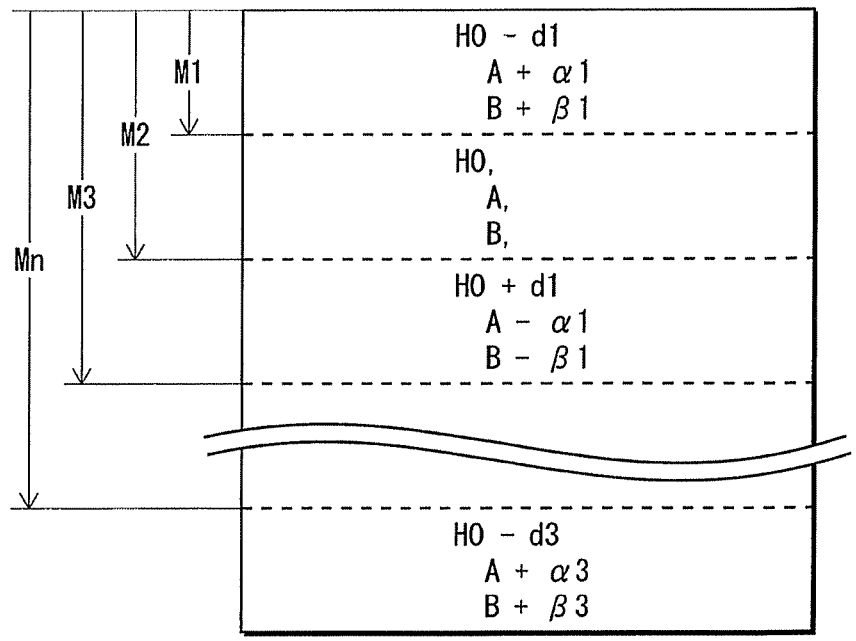
FIG. 12 is a diagram showing transition in image correction parameters that are set for a document in the second embodiment.

FIG. 12 shows transition in the image correction amount on copying paper in a case where a document is read using the image reading apparatus according to the second embodiment, and copied on paper. On the copying paper, image parameter values are changed at every predetermined distance M1, M2, . . . from the leading end. The predetermined distance M1, M2, . . . refers to the time interval at which the subroutine in FIG. 11 is called. In a preferable setting, a timer is used for adjusting as appropriate the time interval at which the subroutine in FIG. 11 is called, so that the subroutine in FIG. 11 is called every time the time is up on the timer.

It should be noted that the present invention is not limited to an image reading apparatus. The present invention may include a method for reading an image including a step of setting the image parameters in the above-described manner. Furthermore, the present invention may include a program for letting a computer execute the method. The program according to the present invention can be stored in various types of computer-readable storage media such as a magnetic tape, magnetic disks such as flexible disk, optical storage media such as DVD-ROM, DVD-RAM, CD-ROM, CD-R, MO, and PD, and flash memory-type storage media. The program may be produced and handed over in the form of these storage media, or may be transmitted and supplied in the form of a program via various types of wired or wireless networks including the Internet, broadcasting, telecommunications, or satellite communications, for example.

<Modified Example>

In the foregoing embodiments, a method was used in which image parameters were changed while a document was being read. It is also possible to use a method in which image parameters are not changed while a document is being read, image data is stored in a memory without any processing, and the memory data is later corrected based on the floating amount. Alternately, it is also possible to use a method in which paper is let to pass in order to detect the floating amount before the document is read, and the document is read after the floating amount has been detected.

Furthermore, an image parameter may be one of the sharpness correction parameter and the density correction parameter, or may be another image correcting parameter that varies depending on the floating amount.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image reading apparatus, comprising:
   an automatic document feeding unit operable to transport a document in a predetermined direction while the document floats above a platen glass member;
   a reading unit operable to read an image on the document at a predetermined fixed reading location while the document is being transported across the predetermined fixed reading location, by irradiating a portion of the document that is passing over the predetermined fixed reading location using a light source disposed below the platen glass member, and by receiving reflected light from the portion of the document;
   a converting unit operable to convert the reflected light into image data;
   a determining unit operable to determine a floating distance between the document and the platen glass member at the predetermined fixed reading location, wherein the floating distance determined by the determining unit is the distance between the document and the platen glass member at the predetermined fixed reading location; and
   a setting unit operable to set a value of an image parameter for correcting the image data for the document, based on the determined floating distance.

2. The image reading apparatus according to claim 1, wherein the setting unit comprises a table in which floating distances are associated with values of the image parameter, and obtains and sets the value of the image parameter referring to the table, based on the determined floating distance.

3. The image reading apparatus according to claim 1, further comprising:
   an input unit used by an operator to adjust the value of the image parameter; and
   a correcting unit operable to correct the set value of the image parameter using an adjustment value that has been input from the input unit.

4. The image reading apparatus according to claim 1, wherein the image parameter is at least one of a sharpness correction parameter or a density correction parameter.

5. The image reading apparatus according to claim 1,
   wherein the determining unit determines the floating distance, once, in a state where the document is held at its leading end by rollers in a downstream of the reading location in a document transport direction, and its trailing end by rollers in an upstream of the reading location in the document transport direction, and
   the setting unit sets the value of the image parameter for the document, once, based on the determined floating distance.

6. The image reading apparatus according to claim 1,
   wherein the determining unit determines a floating distance, at each of a plurality of positions from a leading end to a trailing end of the document, and the setting unit sets values of the image parameter for the document, based on the respective floating distances determined at the plurality of positions.

7. A method for reading an image in an image reading apparatus, comprising:
   a document transporting step of transporting a document with an automatic document feeding unit in a predetermined direction while the document floats above a platen glass member;
   a reading step of reading an image on the document at a predetermined fixed reading location while the document is being transported across the predetermined fixed reading location, by irradiating a portion of the document that is passing over the predetermined fixed reading location using a light source disposed below the platen glass member, and by receiving reflected light from the portion of the document;
   a converting step of converting the reflected light into image data;
   a determining step of determining a floating distance between the document and the platen glass member at the predetermined fixed reading location, wherein the determined floating distance is the distance between the document and the platen glass member at the predetermined fixed reading location; and
   a setting step of setting a value of an image parameter for correcting the image data for the document, based on the determined floating distance.

8. The method for reading an image according to claim 7, wherein in the setting step, referring to a table in which floating distances are associated with values of the image parameter, the value of the image parameter that is in association with the floating distance is obtained and set, the floating distance being determined in the determining step.

9. The method for reading an image according to claim 7, further comprising:
- an input step of accepting an adjustment value that is input by an operator in order to adjust the value of the image parameter; and
- a correcting step of correcting the set value of the image parameter using the input adjustment value.

10. The method for reading an image according to claim 7, wherein the image parameter is at least one of a sharpness correction parameter or a density correction parameter.

11. The method for reading an image according to claim 7,
- wherein in the determining step, the floating distance is determined, once, in a state where the document is held at its leading end by rollers in a downstream of the reading location in a document transport direction, and its trailing end by rollers in an upstream of the reading location in the document transport direction, and
- in the setting step, the value of the image parameter for the document is set, once, based on the determined floating distance.

12. The method for reading an image according to claim 7,
- wherein in the determining step, a floating distance is determined, at each of a plurality of positions from a leading end to a trailing end of the document, and
- in the setting step, values of the image parameter for the document are set, based on the respective floating distances determined at the plurality of positions.

13. A non-transitory computer-readable storage medium storing a program for executing an image reading process in an image reading apparatus,
- wherein the program lets a computer execute:
- a document transporting process of transporting a document with an automatic document feeding unit in a predetermined direction while the document floats above a platen glass member,
- a reading process of reading an image on the document at a predetermined fixed reading location while the document is being transported across the predetermined fixed reading location, by irradiating a portion of the document that is passing over the predetermined fixed reading location using a light source disposed below the platen glass member, and by receiving reflected light from the portion of the document;
- a converting process of converting the reflected light into image data;
- a determining process of determining a floating distance between the document and the platen glass member at the predetermined fixed reading location, wherein the determined floating distance is the distance between the document and the platen glass member at the predetermined fixed reading location; and
- a setting process of setting a value of an image parameter for correcting the image data for the document, based on the determined floating distance.

14. The storage medium according to claim 13,
- wherein in the setting process, referring to a table in which floating distances are associated with values of the image parameter, the value of the image parameter that is in association with the floating distance is obtained and set, the floating distance being determined in the determining process.

15. The storage medium according to claim 13, wherein the program lets the computer further execute:
- an input process of accepting an adjustment value that is input by an operator in order to adjust the value of the image parameter; and
- a correcting process of correcting the set value of the image parameter using the input adjustment value.

16. The storage medium according to claim 13,
- wherein the image parameter is at least one of a sharpness correction parameter or a density correction parameter.

17. The storage medium according to claim 13,
- wherein in the determining process, the floating distance is determined, once, in a state where the document is held at its leading end by rollers in a downstream of the reading location in a document transport direction, and its trailing end by rollers in an upstream of the reading location in the document transport direction, and
- in the setting process, the value of the image parameter for the document is set, once, based on the determined floating distance.

18. The storage medium according to claim 13,
- wherein in the determining process, a floating distance is determined, at each of a plurality of positions from a leading end to a trailing end of the document, and
- in the setting process, values of the image parameter for the document are set, based on the respective floating distances determined at the plurality of positions.

19. The image reading apparatus according to claim 1, wherein the automatic document feeding unit transports further documents in series in the predetermined direction and each of the further documents floats above the platen glass member such that the determining unit determines the floating distance between each respective further document of the series of further documents and the platen glass member and the setting unit sets a value of the image parameter for correcting image data for each respective further document based on the determined floating distance associated with the respective further document.

20. The image reading apparatus according to claim 1, further comprising a detecting unit which detects a first distance from the detecting unit to the document, wherein the determining unit determines the floating distance based on the first distance and one of: (1) a predetermined distance; or (2) a second distance detected by the detecting unit from the detecting unit to the platen glass member.

* * * * *